US006180277B1

(12) United States Patent
Wilkenhöner et al.

(10) Patent No.: US 6,180,277 B1
(45) Date of Patent: Jan. 30, 2001

(54) DISPERSOID-REINFORCED ELECTRODE

(75) Inventors: Rolf Wilkenhöner, Aachen (DE); Robert Vassen, Vaals (NL); Detlev Stöver, Niederzier (DE); Hans Peter Buchkremer, Heinsberg (DE); Werner Mallener, Düsseldorf (DE)

(73) Assignee: Forschungszentrum Jülich GmbH, Jülich (DE)

( * ) Notice: Under 35 U.S.C. 154(b), the term of this patent shall be extended for 0 days.

(21) Appl. No.: 09/320,099

(22) Filed: May 26, 1999

Related U.S. Application Data

(63) Continuation-in-part of application No. PCT/DE97/02746, filed on Nov. 22, 1997.

(30) Foreign Application Priority Data

Nov. 29, 1996 (DE) .............................................. 196 49 376

(51) Int. Cl.$^7$ ...................................................... H01M 4/86
(52) U.S. Cl. .......................... 429/44; 429/40; 429/218.1; 429/223; 429/241; 204/291; 204/292
(58) Field of Search ................................ 429/30, 33, 40, 429/44, 218.1, 223; 204/241, 291, 292, 293; 427/115; 419/1, 2, 6, 10, 19, 23

(56) References Cited

U.S. PATENT DOCUMENTS

| 5,312,582 | 5/1994 | Donado | 419/19 |
|---|---|---|---|
| 5,474,800 | * 12/1995 | Matsuzaki | 427/115 |
| 5,656,387 | 8/1997 | Barnett et al. | 429/33 |

FOREIGN PATENT DOCUMENTS

| 41 22 942 | 1/1992 | (DE) . |
|---|---|---|
| 61-267267 | 11/1986 | (JP) . |
| 1-035865 | 2/1989 | (JP) . |
| 4-067565 | 3/1992 | (JP) . |
| 6-184724 | 7/1994 | (JP) . |
| 9-049001 | 2/1997 | (JP) . |

OTHER PUBLICATIONS

Hibiki Itoh et al., "Configurational and Electrical Behavior of Ni–YSZ Cermet With Novel Microstructure for Solid Oxide Fuel Cell Anodes", *Journal of the Electrochemical Society*, vol. 144, No. 2, Feb. 1997.

Zanibelli et al., "A Catalytic Study of Ni/YSZ Cermets for Internal Reforming SOFC", *First European SolidOxide Fuel Cell Forum Proceedings*, vol. 1, pp. 207–216, 1994 No month available.

Grossman et al., "Processing and Physical Properties of Sol–Gel Derived Nonstructured Ni–Zro/sub 2/Cermets", Conference on Electronic Ceramics and applications, Sep. 5–7, 1994, vol. 2.

Dees et al. "Conductivity of Porous Ni/ZrO$_2$–Y$_2$O$_3$ Cermets", Journal of the Electrochemical Society, 134, Sep. 1987 No. 9.

* cited by examiner

*Primary Examiner*—Bruce F. Bell
(74) *Attorney, Agent, or Firm*—Klaus J. Bach

(57) ABSTRACT

In a dispersoid-reinforced electrode with a net-like open pore structure and a ceramic and a metallic meshwork, ceramic particles with an average particle diameter of less than 100 nm are homogeneously distributed in the metallic network thereby reinforcing the electrode.

3 Claims, 3 Drawing Sheets

DISPERSOID-REINFORCED ELECTRODE

This is a continuation in part application of international application PCT/DE97/02746 filed Nov. 22, 1997 and claiming the priority of German application 196 49 376.5 filed Nov. 29, 1996.

BACKGROUND OF THE INVENTION

The invention relates to an electrode with a net-like open pore system and with a ceramic and a metallic meshwork. The mesh works penetrate each other.

The invention also resides in a method of manufacturing such an electrode.

The open pore system facilitates a material transport through the electrode. The ceramic meshwork provides for the mechanical stability of the electrode. The metallic meshwork serves as electron conductor and as catalyst.

Such an electrode, that is, an anode of a high temperature fuel cell is disclosed in published German patent application No. 196 30 843.7. It has an open pore system, that is, it is porous throughout. Materials such as gaseous fuel, oxidation media or water may pass through the anode. The ceramic mesh work consists of zirconium oxide. It makes the electrode mechanically stable. The metallic meshwork consists of nickel. It conducts electrons and serves as a catalyst for the chemical reactions, which take place in the high temperature fuel cell.

It is however disadvantageous that there is a self-diffusion of the metal. Under high temperature conditions, a diffusion of metal in metal takes place in the anode, that is, for example nickel diffuses in nickel or platinum in platinum. The self-diffusion results in a coagulation that is in an increase of the metallic mesh work. The increased reduces the electrochemically active surface area. The electrochemically active surface area is the surface on which the electrochemical reactions take place which are necessary for the operation of the fuel cells. When the electrochemically active surface area of the fuel cell becomes smaller, the capacity of the fuel cell becomes smaller.

It is the object of the present invention to provide an electrode, which is efficient and effective over a long period of time.

SUMMARY OF THE INVENTION

In a dispersoid-reinforced electrode with a net-like open pore structure and a ceramic and a metallic meshwork, ceramic particles with an average particle diameter of less than 100 nm are homogeneously distributed in the metallic network thereby reinforcing the electrode.

It has been found that the dispersoid reinforcement of the electrode inhibits the occurrence of the disadvantageous self-diffusion. The increase of the electron-conductive network, which normally occurs under the given operating conditions, is counteracted. The electrochemically active surfaces in the electrode become more stable. The efficiency of the electrode is therefore maintained over an extended period.

A dispersoid reinforcement is to be understood as a homogeneous distribution of ceramic particles in the metal wherein the ceramic particles have an average diameter of less than 100 nm. Preferably, the diameter of the particles to a large extent is less than 30 nm.

The larger the content of the ceramic particles (below also called dispersoids) in the metal (below also called metal matrix), the more stable is the behavior of the electrode. The content is limited on the upside since a ceramic meshwork is formed by these particles in the metal when an upper limit of the particle content is exceeded. Then the desired homogeneous distribution of particles with an average diameter of less than 100 nm is no longer present.

The content of the ceramic particles in the metal is therefore between 0.5 and 15 vol. %, preferably at least 10 vol. %.

For the manufacturing and operating conditions of the electrodes, the following should be taken into consideration concerning the selection of the materials of which the dispersoids consist or are made:

The dispersoids should be inert in the metal matrix. That is, they should not dissolve therein. No chemical reactions should take place between the metal matrix and the dispersoid material. Otherwise, the advantageous dispersoid structure is changed.

The atoms or ions of the dispersoid material should have sufficiently low solubility in the metal matrix. This sufficiently low solubility exists particularly if the inter-diffusion of the atoms or ions in the metal matrix is so low that the advantageous dispersoid structure is not increased.

The dispersoids should be thermodynamically stable. They should be thermally stable so that they are not destroyed at operating temperatures. In high temperature fuel cells, where the electrodes according to the invention are preferably utilized, the operating temperature is presently between 600 and 1050° C.

The dispersoids should also be stable under reducing conditions, that is, at low oxygen partial pressures. In high temperature fuel cells, the typical oxygen partial pressure present in the atmosphere at the anode is between $10^{-14}$ and $10^{-20}$ bar.

The dispersoids should be as hard as possible in order to effectively inhibit permutation controlled high temperature deformation processes, which may result in a structure change of the metal matrix.

In a preferred embodiment of the invention, the material for the dispersoids is so selected that the mechanical compatibility between the metallic, catalytically effective meshwork and the ceramic meshwork is improved. Such an improvement is then present when, as a result of the dispersoid reinforcement, the linear expansion coefficient of the metallic meshwork is adapted to that of the ceramic network, that is, both expansion coefficients are closely matched. Consequently, the dispersoids should have an expansion coefficient, which is about the same as that of the ceramic meshwork.

If the expansion coefficient of the metallic meshwork is greater than that of the ceramic meshwork, the expansion coefficient of the dispersoids is preferably smaller than, or equal to, the expansion coefficient of the ceramic meshwork in order to achieve the adaptation referred to before. If the expansion coefficient of the metallic meshwork is smaller than that of the ceramic mesh work, the expansion coefficient of the dispersoids is preferably greater than, or equal to, the expansion coefficient of the ceramic meshwork.

For example: the ceramic meshwork of an anode of a solid electrolyte fuel cell consists of $ZrO_2$, which is doped with 8 mol % $Y_2O_3$, that is, of so-called 8YSZ. The metallic meshwork of this anode consists of nickel. For the adaptation of the thermal expansion coefficients of the two mesh works, a dispersal reinforcement of the nickel with 8YSZ is suitable.

There are different possibilities for the manufacture of dispersoid-reinforced metallic powder:

Processes wherein the dispersoid material is so combined with the metallic material that, at the end, it is present in the metal as a ceramic:

Mechanical alloying of metal powder-like ceramic dispersoid material,

Mixing, by stirring, of powder-like ceramic dispersoid material into a metal melt. The melt alloyed in this manner is subsequently processed to a powder for example, by a nozzle spray process.

Processes, wherein the dispersoid material is introduced first in metallic form into the metallic material:

metallic alloying of metal powder with powder-like metallic dispersoid material, melt metallurgical alloying of the metal with the dispersoid material. The melt alloyed in this way is subsequently processed to a powder by nozzle spraying, implantation of ions of the dispersoid material, which is first present as a metal, into the metal (ion implantation).

By a subsequent heat treatment of the alloyed powder obtained only the content of dispersoid material in the powder particles is selectively oxidized (internal oxidation). Because of the selective oxidation, the dispersoid material is converted within the metal to a ceramic. The metallic material, which is to form the metallic meshwork remains chemically unchanged. Altogether, the metal is, in accordance with the method of the invention, dispersoid reinforced.

Methods, wherein the dispersoid material is introduced in ceramic form in oxidized metal called below matrix material:

Mechanical alloying of ceramic matrix and dispersoid materials, spray drying of a salt solution which contains the metal ions of the matrix and the dispersoid materials. A subsequent calcination of the spray-dried powder results in the removal of all other components of the salt and in the oxidation of matrix and dispersoid materials.

By a subsequent heat treatment of the alloyed powder obtained only the matrix material in the powder particles is selectively reduced. The ceramic dispersoids remain chemically unchanged. In this way, the dispersoid-reinforced metal according to the invention is formed.

Methods, wherein the dispersoid material is applied as fine particles of the metallic material. In a subsequent heat treatment for the oxidation of the metallic material, these particles are transported with the conversion front metal oxide/metal into the powder particle out of the metal.

Vapor deposition of the dispersoid material on the metal powder (PVD- or CVD process), Immersion of the metal powder into a finely dispersed stable suspension which contains the ceramic dispersoids.

DESCRIPTION OF A PARTICULAR EMBODIMENT

Below the invention will be described in greater detail on the basis of dispersoid-reinforced nickel employed as a catalytically effective metal for an anode of a solid electrolyte fuel cell (Solid Oxide Fuel Cell, SOFC).

8YSZ-powder of the company TOSOH (Japan) manufacturing designation TZ-8Y, particle size 0.3 μm, crystallyte size 24 nm and nickel powder of the company Merck (Germany), purity >99.5%, particle size <10 μm, are suitable as initial powder.

The nickel powder and the 8YSZ-powder are placed together with grinding balls of 3YSZ (zirconium oxide doped with 3 mol % $Y_2O_3$) into a grinding container of MgSZ (magnesium-stabilized zirconium oxide) and are alloyed mechanically by grinding parameters which have been found to be advantageous, and also the composition of the powder charges obtained.

The 8YSZ powder is dispersed during the grinding procedure and is worked into the nickel powder. After a grinding operation of 90 hours, the powder mixtures contain about 6 wt % abrasion fines of the grinding balls and of the grinding container. Furthermore, about 4 wt % of the nickel content is oxidized.

Table 2 shows the composition of mechanically alloyed powder charges as well as the particle size thereof.

These mechanically alloyed powders exhibit a monomodale particle size distribution and a uniform particle morphology. X-ray diffractometer examination of the powder charge 2 show that the mechanically alloyed powder is very fine. The average particle size of this charge is about 15 nm.

The parameters listed in table 3 are suitable to make pressed bodies of a size 20×5×5 $mm^3$ from the mechanically alloyed powder charges as well as—for reference—from the unalloyed nickel powder.

From the pressed bodies, the binders are removed in accordance with the provisions given in table 4, that is, the pressing aids are burned out and the pressed bodies are then sintered. The binders are removed under vacuum in step 1. Subsequently, in step 2, a reducing atmosphere of argon with 4 vol % hydrogen is established, wherein the test bodies are sintered in accordance with steps 3 to 5.

Figure 1:
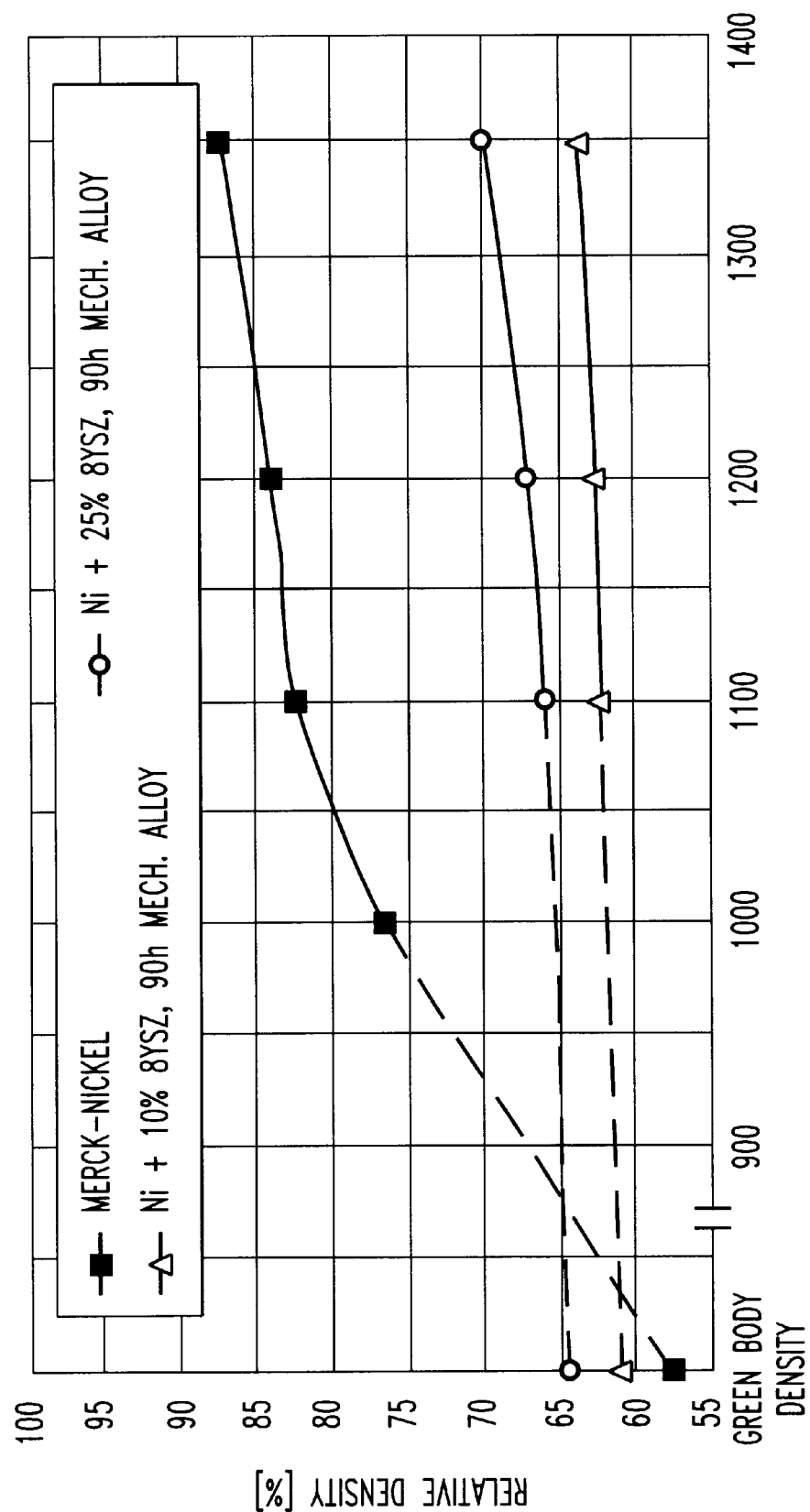
FIG. 1 shows the sintering behavior of the pressed bodies (sintering time in each case, 1 hr, at 1350° C. 2 hrs)

FIG. 1 shows the dependence of the relative density on the sintering temperature for pressed bodies consisting of various powder charges. Significant differences in the sintering behavior of the pressed bodies of unalloyed nickel in comparison with those of mechanically alloyed nickel are apparent.

Pressed bodies of unalloyed nickel powder become substantially denser than those of alloyed Ni/8YSZ powder under the same sintering conditions.

The density of alloyed pressed bodies with 10 vol % 8YSZ is essentially not increased by the sintering; even sintering at 1350° C., that is, only about 100° C. below the melting point of pure nickel, results in only a very slight densification.

The alloyed pressed bodies with 25 vol % 8YSZ also show only a slight densification after sintering at 1100° C. At temperatures ≧100° C. the sintering of the 8YSZ content begins in the alloyed pressed bodies, whereby a mesh work is formed since the 8YSZ powder used can easily be sintered at such temperatures. This 8YSZ meshing results in a greater sintering effect of these pressed bodies at temperatures ≧1200° C. as compared to pressed bodies of mechanically alloyed nickel including 10 vol % 8YSZ.

Figure 3:
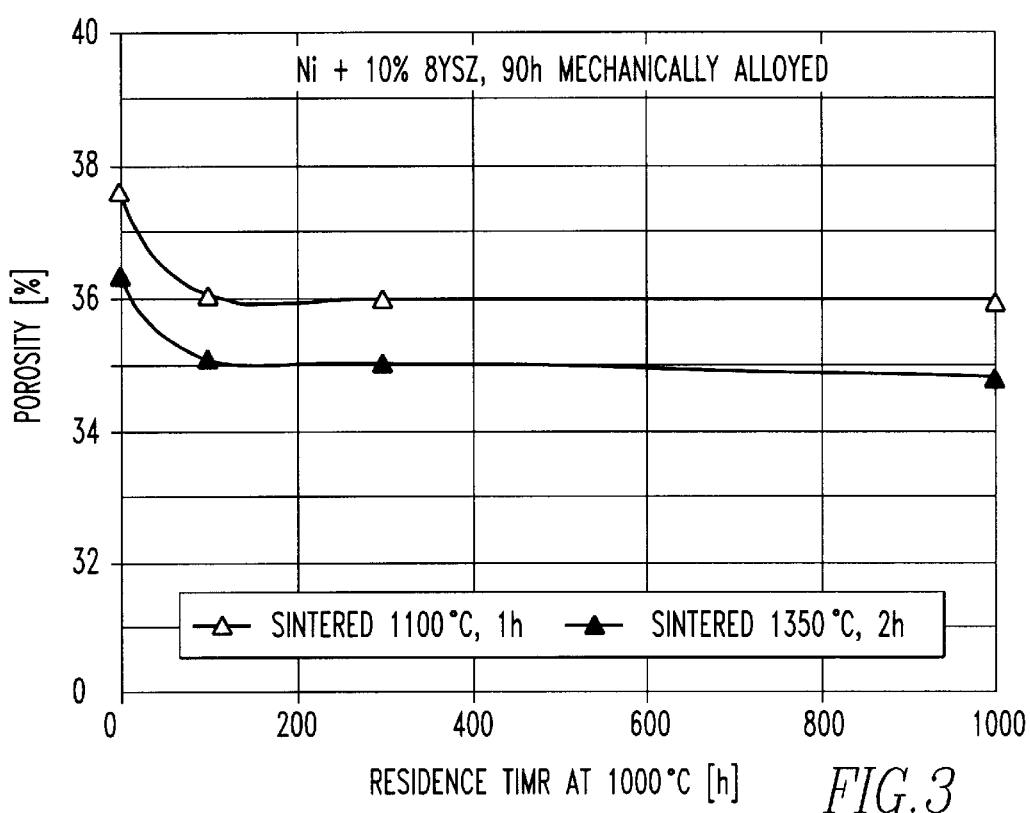
Figure 4:
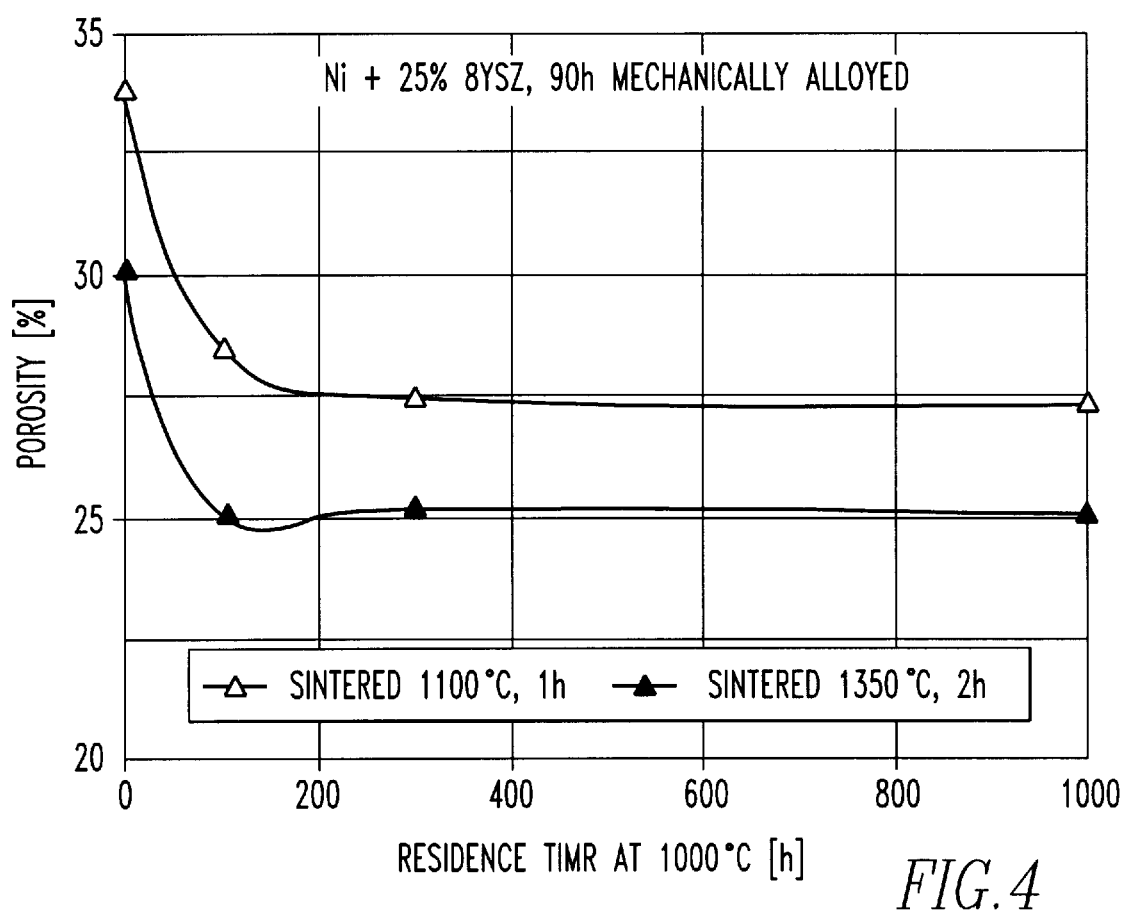

Several of the pressed bodies were exposed to a reducing atmosphere of argon with 4 vol % hydrogen at 1000° C. for 1000 hrs under isotherm conditions. Under these conditions, pressed bodies of mechanically alloyed nickel show a significantly better structure stability than pressed bodies of unalloyed nickel, see FIGS. 2 to 4.

Figure 2:
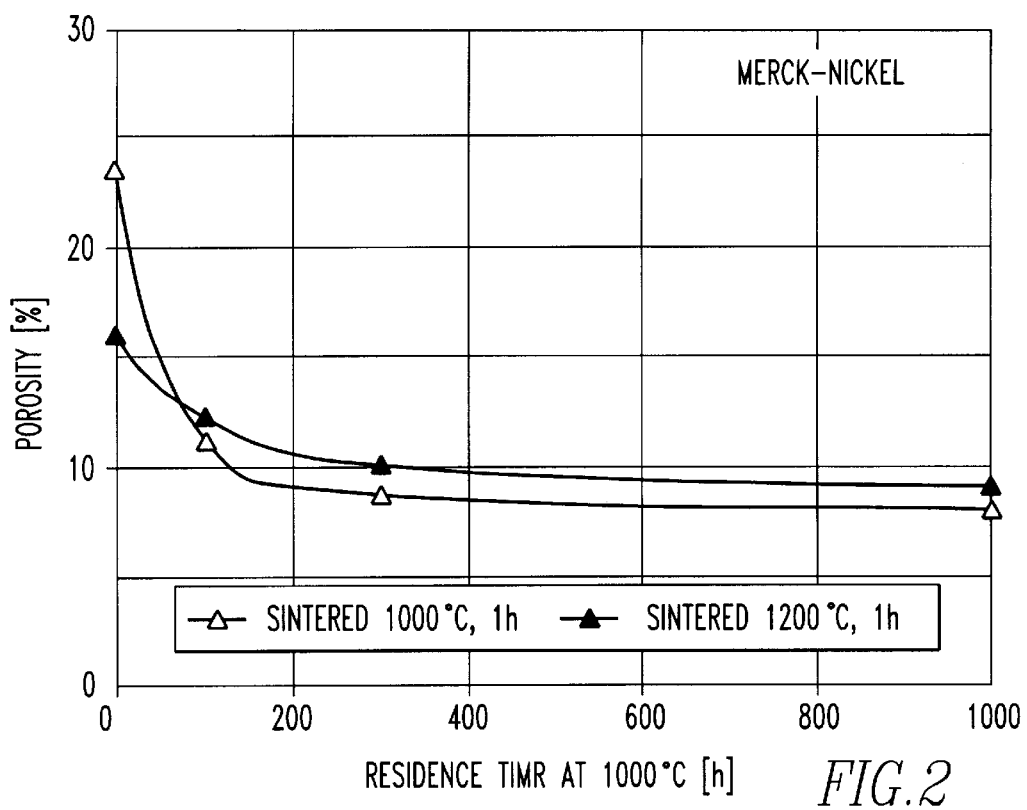
FIGS. 2–4 show the porosity of the pressed bodies of the unalloyed and mechanically alloyed nickel powder for various sintering conditions.

The pressed bodies consisting of the same unalloyed nickel initial powder are highly densified during the isothermal maintenance period, see FIG. 2. The open porosity in the structure is reduced so that, at the end of the maintenance period, only spherical pores, which are isolated from one another remain. A late sinter state is obtained.

The pressed bodies of mechanically alloyed nickel powder including 10 vol % 8YSZ exhibit only a small densification of 1 to 2% at the beginning of the measuring period. If the maintenance period is extended, the density remains unchanged. Metallographic examinations show that, at the beginning of the maintenance period, the particles are spherical and are interconnected only by short sinter necks. After a maintenance period of 1000 hours, the original particles are sintered together to a meshwork in such a way that they can hardly be distinguished from the sinter necks: The particles have lost their individuality. The pores are rounded, the cross-linking of the pore structure, however, is still present. This corresponds to the transition from an initial sintering state to an intermediate sintering state.

TEM photos of pressed bodies of mechanically alloyed nickel with 10 vol % 8YSZ show a homogenous distribution of 8YSZ dispersoids in the nickel particles. The size distribution of the dispersoids is between 20 and 100 $\mu$m, wherein most dispersoids have about the size of the initial 8YSZ powder particles (24 nm). This dispersoid structure results in an advantageous stabilization of the nickel, that is, in a lower sinter activity and in an improved structure stability during the isothermal maintenance period. The dispersoid structure inhibits to a great degree the mechanisms of the nickel self diffusion in the nickel matrix. The material transport of nickel in nickel is therefore substantially slowed down, which results in an improved structural stability.

Pressed bodies of mechanically alloyed nickel with 25 vol % 8YSZ are densified during the isothermal maintenance period at a density increase of 3 to 6%, which is a greater densification than that of pressed bodies having 10 vol % 8YSZ. In these pressed bodies, the 8YSZ content is so high that the 8YSZ particles are partially interconnected. For this reason, the structure of the 8YSZ dispersoids in the nickel matrix may become coarser during the isothermal maintenance step so that its advantageous influence on the slowing of the nickel self diffusion in the nickel matrix is diminished.

TABLE 1

| Composition of the Powder Charge | Charge 1: 93.1 b Ni, 6.9 g 8YSZ (10 vol. % 8YSZ) charge 2: 81.9 g Ni, 18.1 g 8YSZ (25% vol. 5 8YSZ) |
|---|---|
| Mill | Planetary mill, type PM4, Company Retsch, GERMANY |
| Milling Container | MgSZ, Φ 10 cm |
| Milling balls | 3YSZ, Φ 10 mm |
| Weight ratio milling balls: Powder [wt. %] | 6:1 |

TABLE 1-continued

| Rotational speed of the mill [1/min] | Charge 1: 150 Charge 2: 250 |
|---|---|
| Atmosphere | Air |
| Grinding Duration [h] | 90 |

TABLE 2

| Powder Charge | Composition | Average Particle Size |
|---|---|---|
| 1 | Nickel + 10 vol % 8YSZ | 12 $\mu$m |
| 2 | Nickel + 25 vol % 8YSZ | 7 $\mu$m |

TABLE 3

| Powder Charge | 8YSZ content | weight | compression aid | Content pressure aid * | pressure force | Pressed body density |
|---|---|---|---|---|---|---|
| Merck Nickel | 0 vol % | 2.82 g | PVAL in EtOH | <1 wt. % | 21.4 kN | 57.9% |
| 1 | 10 vol % | 2.73 g | 20% PVAC in Az. | 2 wt.% | 60.9 kN | 61.1% |
| 2 | 25 vol % | 2.58 g | 20% PVAC in Az. | 1.5 wt % | 60.9 kN | 64.5% |

PVAL: Polyvinylalcohol, PVAC: Polyvinylacetate, EtOH: Ethanol, Az: Acetone
*after evaporation of the solvent PVAL or, respectively, EtOH

TABLE 4

| | Desired Value | | Rate | | | Pressure |
|---|---|---|---|---|---|---|
| Step | from °C. | to [°C.] | [°C./min] | Time | Atmosphere | [mbar] |
| 1 | RT | 500 | 2 | | Vacuum | $10^{-3}$ to $10^{-4}$ |
| 2 | 500 | 500 | 0 | | Ar + 4% $H_2$ | 1100* |
| 3 | 500 | $T_s$ | 2 | | Ar + 4% $H_2$ | 1100* |
| 4 | $T_s$ | $T_s$ | 0 | $t_s$ | Ar + 4% $H_2$ | 1100* |
| 5 | $T_s$ | RT | 5 | | Ar + 4% $H_2$ | 1100* |

RT: Room Temperature, $T_s$ = Sinter temperature, $t_s$ = sinter time
*in the passage

What is claimed is:

1. A dispersoid reinforced electrode with a net-shaped open pore system, a ceramic and a metallic meshwork and ceramic particles with an average particle diameter of less than 100 nm homogeneously distributed in the metallic meshwork.

2. An electrode according to claim 1, wherein the homogeneously distributed ceramic particles have an expansion coefficient which is about the same as the thermal expansion coefficient of the metallic meshwork.

3. An electrode according to claim 1, wherein the metallic meshwork includes 0.5 to 15 vol % of ceramic particles.

* * * * *